I. S. & C. N. Brown,
Saw Teeth,
Nº 76,395.     Patented Apr. 7, 1868.

Witnesses:
J. A. D. Joslin
George S. Burnham

Inventor:
Ira S. Brown
Charles N. Brown

United States Patent Office.

IRA S. BROWN AND CHARLES N. BROWN, OF PROVIDENCE, RHODE ISLAND, ASSIGNORS TO THEMSELVES AND J. MASON GROSS, OF SAME PLACE.

Letters Patent No. 76,395, dated April 7, 1868; antedated January 3, 1868.

IMPROVEMENT IN SAWS.

The Schedule referred to in these Letters Patent and making part of the same.

TO ALL WHOM IT MAY CONCERN:

Be it known that we, IRA S. BROWN and CHARLES N. BROWN, of the city and county of Providence, and State of Rhode Island, have invented certain new and useful Improvements in Saws; and we do hereby declare that the following is a full and exact description thereof, reference being had to the accompanying drawings, in which—

Figure 1:
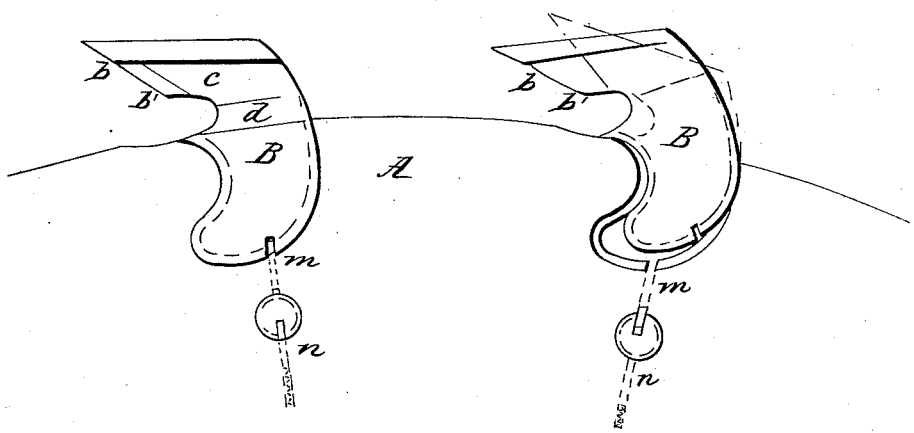
Figure 1 is a side elevation of a portion of a circular saw, with our improvements attached, and with one tooth partly removed.

Our invention relates to that class of saws in which the teeth are made separate, and inserted into the plate.

The nature of our invention consists, first, in the peculiar form given to that portion of the tooth which fits into the saw-plate, whereby the action of the tooth against the wood tends to drive the former the more firmly into its place, and thereby the liability to jar loose in action is very greatly lessened, while the absence of salient angles in the fitting portion of the tooth gives great strength to the saw-plate.

The nature of our invention also consists in the arrangement of the locking-device, by which the centrifugal force generated by the motion of the saw tends to hold it in place, whereby the liability to the escape of the tooth in action is lessened.

The nature of our invention also consists in the combination of a cutting and planing-tooth in one piece of metal.

To enable others skilled in the art to make and use our invention, we will proceed to describe the construction and operation of the same by reference to the drawings.

A is a saw-plate, with recesses formed therein for the reception of the teeth. B are the teeth, fitted with shanks of a slightly-hooking form, without salient angles, adapted to just fill the recesses in the saw-plate, as represented. The edges of the shanks are grooved, and the edges of the recess sharpened in the usual manner, for the purpose of holding the tooth firmly in a lateral direction.

It will be observed that the hook-formed shank stands with its concave side in the direction of the motion of the saw, and that a force applied to the tooth in a direction opposite thereto, as the resisting action of the wood in sawing, tends to crowd the shank more firmly into place. The centrifugal action at the point of the tooth, due to its tendency to "eat in" to the work, also has the same effect, and as these are the principal strains received by the teeth while in action, there is little or no tendency for them to become detached from the plate; but to prevent the possibility of such an occurrence, we employ the locking-device shown in the drawings, which forms the subject of patent No.         issued to us          1865, and is fully described in the specification thereto attached. By this form of tooth, however, we are enabled to place the locking-device, with the bolts $m\ n$, in a direction radial or nearly so to the saw, whereby the centrifugal force generated by the rotation of the saw is available for holding the said bolts in their locked position, while the jar and friction of sawing have no tendency to force them in the opposite direction. It will be observed that there is no strain whatever upon the locking-device when the saw is cutting, as then the teeth are forced continually into their sockets; but without the locking-device, or some equivalent therefor, they might jar loose when running light.

In fig. 1, a tooth is shown partly removed, its fixed position being indicated by red lines. It will be seen that the point has to be moved forward and downward to remove the tooth, and that a force applied in the opposite direction will reseat it; also, that if the tooth becomes loosened, from any cause, while running, the point drops, so that the heel is the first to come in contact with the table or guard, and the tooth is thereby knocked back into its place, without any tendency to catch at the point, and break it or the saw-plate.

Figure 2:
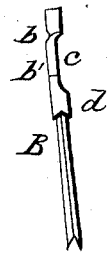
Figure 2 is a front elevation of the tooth.
Figure 3:
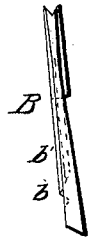
Figure 3 is a plan of the same.

The shape of the acting portion of the tooth in our improved saw is peculiar, in that it is made to perform the double function of a cutting and a planing-tooth combined in one piece of metal. This is accomplished as follows: Beneath the cutting-point, which is as usual, the tooth is bent, so as to stand hard over to one side of the kerf, and then formed into a curved cutting-edge, $b\ b'$, as represented more plainly in fig. 2. The rounded portion, $b$, being furthest from the centre of the saw, first comes into action, and, as a gouge, removes the greater portion of the irregularities left in sawing, when the straight portion, $b'$, smooths the surface, its inclined position causing it to act with a drawing cut, and thus performs its work with ease and perfection. The side of the tooth opposite the planing-edge is hollowed or grooved, as shown at $e$, to permit the escape of the chips in the obvious manner. The base of the tooth, at $d$, is thickened, so as to nearly fill the kerf, and thus steady the tooth, and prevent vibration. The point is bevelled, so as to present its longest corner opposite the planing-edge, and thus counteract in a measure the tendency of the latter to eat in to the work.

It is not necessary to the success of our invention that the shape of the shank of our tooth should be precisely as shown, but we believe that to be the best form. By so forming the tooth that the centre of gravity is forward of the shank, the constant tendency of the centrifugal force will be to hold the tooth in place, in which case the locking-device will serve merely as an additional safeguard.

Having now fully described our invention, what we claim as new therein, and desire to secure by Letters Patent, is—

The combination of a cutting and a planing-tooth in one and the same piece of metal, constructed and operating substantially as above specified.

IRA S. BROWN. [L. S.]
CHARLES N. BROWN. [L. S.]

Witnesses:
 J. A. D. JOSLIN,
 GEORGE H. BURNHAM.